July 28, 1970  L. J. BALL  3,522,337
METHOD AND APPARATUS FOR CONTACTING THE INTERIOR
SURFACE OF TUBULAR ARTICLES
Filed April 26, 1968  2 Sheets-Sheet 1

INVENTOR.
L. J. BALL
BY
ATTORNEYS

July 28, 1970  L. J. BALL  3,522,337
METHOD AND APPARATUS FOR CONTACTING THE INTERIOR
SURFACE OF TUBULAR ARTICLES
Filed April 26, 1968  2 Sheets-Sheet 2

INVENTOR.
L. J. BALL
BY Young and Dwigg
ATTORNEYS

United States Patent Office

3,522,337
Patented July 28, 1970

---

3,522,337
METHOD AND APPARATUS FOR CONTACTING THE INTERIOR SURFACE OF TUBULAR ARTICLES
Lawrence J. Ball, Bartlesville, Okla., assignor to Phillips Petroleum Company, a corporation of Delaware
Filed Apr. 26, 1968, Ser. No. 724,363
Int. Cl. B29c *17/00;* B29d *23/04*
U.S. Cl. 264—95                            5 Claims

ABSTRACT OF THE DISCLOSURE

This invention relates to a method and apparatus for contacting the interior of a tubular article in a restricted length. Conveying means for a first and second fluid are disposed internally in said article such that said second fluid is conveyed to one extremity of said restricted length and said first fluid is conveyed to the other extremity, the direction of flow of said first fluid is reversed and the interior of said article is contacted with said first fluid flowing in the opposite direction of said second fluid, said first fluid is removed from contact with the interior of said article by the abrupt collision with said second fluid whereby said first and second fluids are forced into an exit conveying means internally disposed in said article.

BACKGROUND OF THE INVENTION

This invention relates to a novel method and apparatus for contacting an intermediate length of the interior surface of a tubular article with a fluid. In one aspect it relates to an arrangement of fluid conveying means disposed within said article. In another aspect it relates to an apparatus for countercurrently quenching an intermediate length of the interior of a tubular thermoplastic extrudate.

In the plastics-fabricating industry, it is the usual practice in making plastic tubing to extrude thermoplastic through an annular die in the form of tubing which is shaped to the desired size by a sizing tube or the like, and then to cool the extruded tubing, usually with water. In fabricating such plastic tubing, bubbles of air, steam or other gases and vapors are usually formed and cling to or collect on the extruded plastic tubing as it is cooled. As a result, these bubbles cause the plastic tubing to cool unevenly and give rise to surface defects, such as pockmarks, dimples, etc. Such surfaces are undesirable from the standpoint of serviceability, as, for example, in utilization of plastic tubing wherein a smoother internal surface produces a low pressure drop. These surface defects especially occur where the plastic tubing is cascaded or sprayed with water, or immersed in a water bath, and such defects become aggravated at high extrusion rates.

Obtaining maximum even heat-removal rates is a serious problem in itself. Non-uniform heat-removal rates cause distortion and the setting up of strains which become manifest when the product is used for the formation of bottles wherein the parison formed from the extruded tubing is biaxially oriented prior to the formation of the bottle by blow molding, vacuum molding, etc. Another prevalent problem is the formation of finished products from parisons thus produced of acceptable clarity and transparency. One solution involves nucleation of the thermoplastic with a suitable compound to produce this desired property, but this becomes expensive by adding further starting materials and an increased number of process steps.

As heretofore mentioned, prior art solutions have been mainly restricted to exterior quenching of the tube immediately after extrusion; however, with wall thickness greater than that of films, this is not conducive to uniform cooling unless the interior is also cooled at the same time. A few prior art solutions have been correctly directed to the necessary cooling of the interior of the extruded tubing, but have been mainly directed to indirect cooling of the interior of the forming mandrel due to the many problems associated with direct contact cooling of the interior of said extruded tubing.

In order to provide direct contact of cooling fluid with the interior of a continuously extruded hollow tube, an intermediate length of said tubing would have to be defined by two spaced apart barriers between which cooling fluid would be circulated. A simple mechanical disk could be used at the downstream end of this intermediate length since at this point the extrudate would be essentially solidified. At the upstream end of this intermediate length, however, the use of a physical barrier would cause scratches on the soft inner surface which would make the tubing unacceptable for uses such as parisons from which clear bottles are molded. The die mandrel cannot be used with any degree of satisfaction since it would be unduly chilled by the cooling fluid, thus impairing the initial extrusion.

Accordingly, an object of this invention is to provide a method and apparatus for the extrusion of thermoplastic tubing having an internal surface which is smooth and free from surface defects.

Another object of this invention is to provide an improved apparatus for the production of thermoplastic articles of improved clarity and transparency.

Accordingly, a further object of this invention is to provide extruded thermoplastic tubing having improved clarity and transparency and having an internal surface which is smooth and free from surface defects.

Accordingly, a still further object of this invention is to provide an apparatus for contacting the interior of a moving tubular thermoplastic extrudate in intermediate length with a fluid, in such a manner that mechanical seals are not required until said article has sufficiently hardened to prevent abrasion damage to the interior of the article.

SUMMARY OF THE INVENTION

Accordingly, the instant invention provides an apparatus for contacting an intermediate length of the interior of a tubular article. Accordingly the instant invention further provides a fluid seal or barrier to define one end of said intermediate length. Means are provided for conveying a first and second fluid from sources of same located at one end of the article and for injecting said first fluid into a first end of said intermediate length in the opposite direction of flow of said second fluid, said first fluid contacting the interior of said intermediate length from said first end up to a second end, said second fluid is injected into said second end of said intermediate length and means located at said second end are provided for removing said first and second fluids from said article.

In further accordance with the instant invention, two coaxial conduits are disposed within a tubular article, a first annular passageway is defined by said article and a first conduit, said passageway communicating between a source of a second fluid and a first extremity of said intermediate length; a second annular passageway is defined by said first conduit and a second conduit, smaller than said first conduit and extending into said intermediate length and in open communication between the interior of said article in said intermediate length and a source of a first fluid, said second annular passageway communicating between the interior of said tubular article in said intermediate length at said first extremity and an exit means; a plugging means is provided within said tubular article coaxially spaced beyond said first extremity of said intermediate length at the second extremity of said intermediate length.

DESCRIPTION OF PREFERRED EMBODIMENTS

Figure 1:
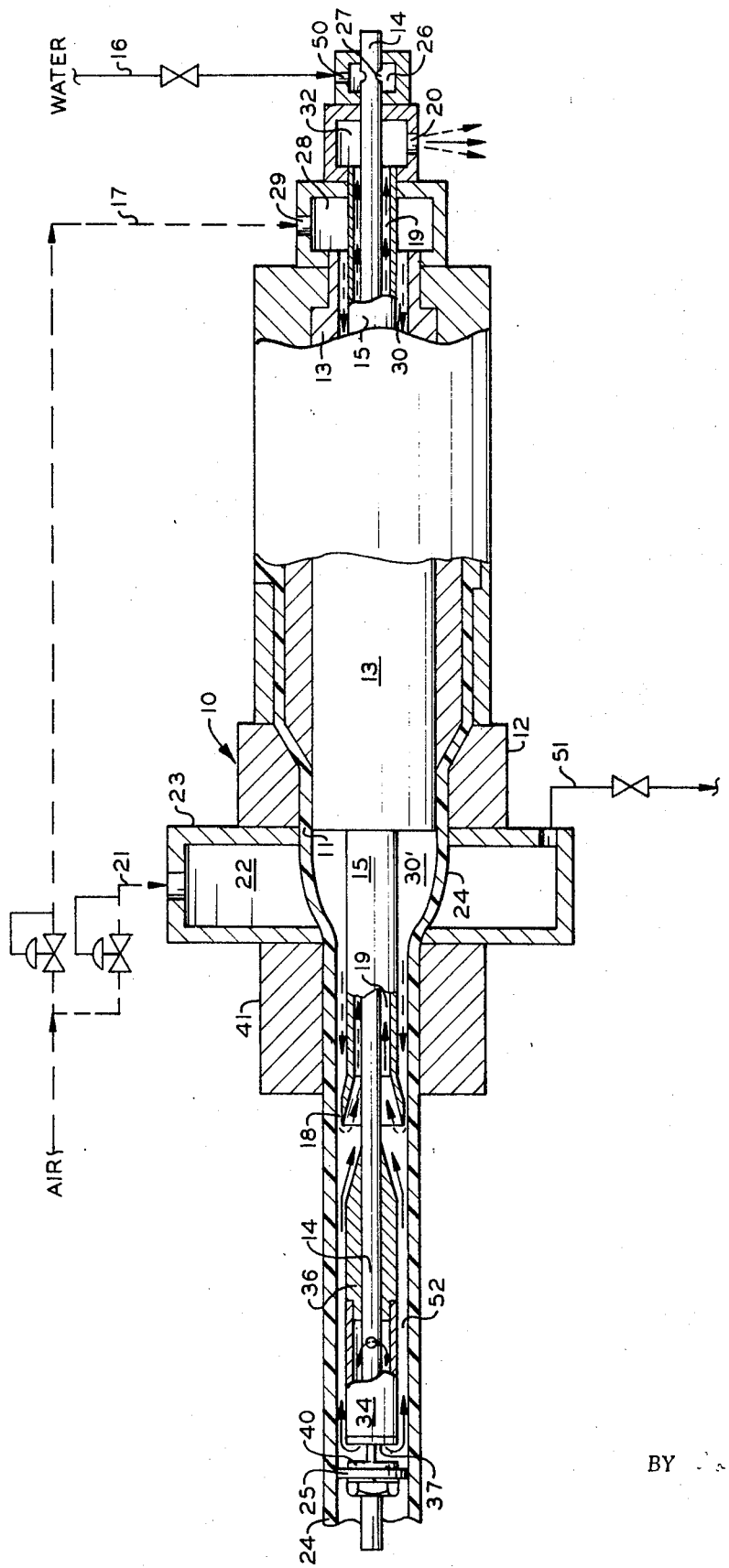
FIG. 1 is a schematic illustration of the apparatus according to the preferred embodiment of the invention.

Referring now to the drawings, and particularly to FIG. 1, the die 10 has an annular opening 11 which is formed by die bushing 12 and die mandrel 13 through which extrudate 24 passes. Inside said mandrel 13 are positioned two concentric pipes 14 and 15. Conduit 16 supplies coolant to the interior of pipe 14, and conduit 17 supplies a gaseous medium to the annular passageway 30 between pipe 15 and mandrel 13. Said cooling medium travels through pipe 14 and is directed against the extrudate 24 by a resilient disk seal 25. The cooling medium contacts the interior surface of the extrudate by traveling from disk 25 to about point 18. The gaseous medium flowing through passageway 30' forms a barrier to the further travel of the coolant at 18 and the gaseous medium and coolant exit through annular area 19 and are exhausted through opening 20. Conduit 21 supplies gaseous medium to area 22 of pressure equalization chamber 23.

Figure 3:
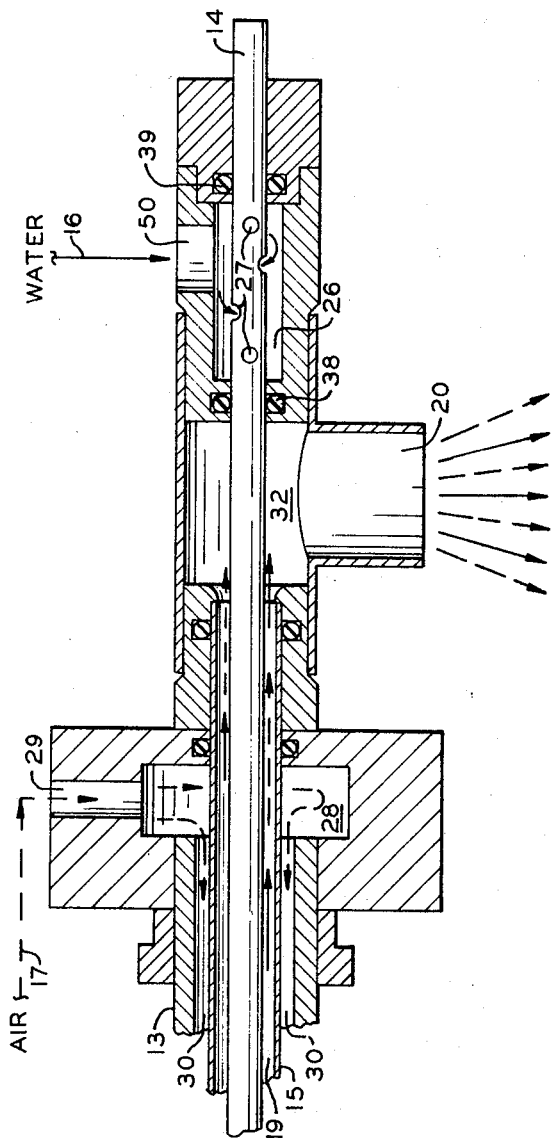
FIG. 3 is another enlarged view, partly in section, showing the entry and exit means for a cooling medium and a gaseous medium.

Referring now to FIG. 3, cooling medium enters from conduit 16 through opening 50 and into chamber 26. From chamber 26 the cooling medium enters the interior of conduit 14 via openings 27. The gaseous medium enters through conduit 17 into chamber 28 via opening 29, and flows through chamber 28 into annular opening 30 formed by tubular conduit 15 and mandrel 13. Both the gaseous medium and the coolant are exhausted through annular opening 19 formed by tubular conduit 14 and pipe 15 into chamber 32 which is opened to the atomsphere through opening 20.

Figure 2:
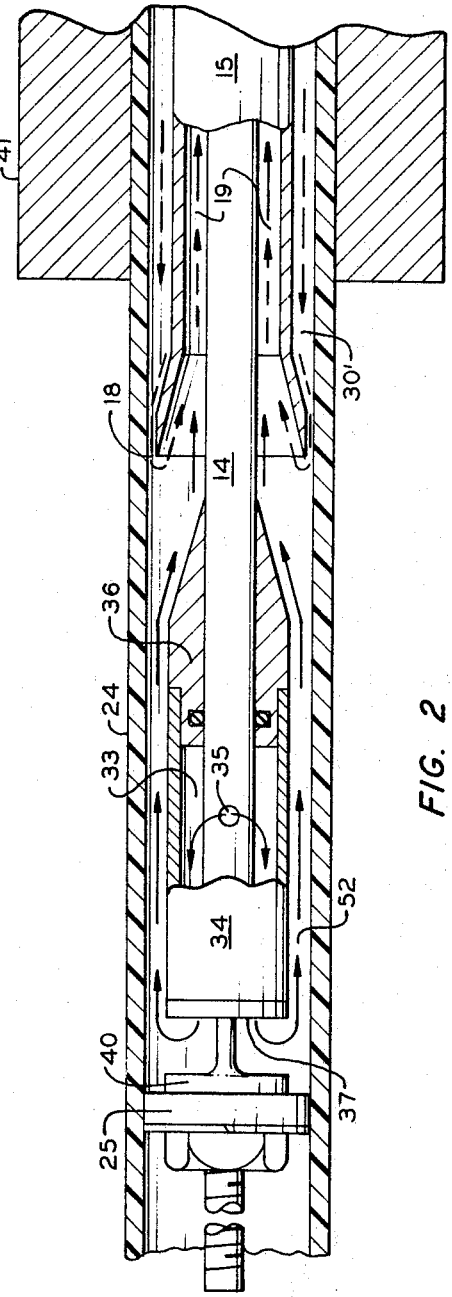
FIG. 2 is an enlarged view, partly in section, of the contact area.

Referring now to FIG. 2, the coolant traveling through pipe 14 is exhausted via openings 35 into the annular opening 33 formed by tubular conduit 14 and concentric pipe 34. Concentric pipe 34 is attached to pipe 14 by a sealing means 36, said sealing means is tapered from the diameter of pipe 34 to that of pipe 14 to minimize turbulent effects in this region. The collant in annular area 33 flowing out of opening 37, flows against a resilient seal 25. This seal may be composed of rubber, nylon, Teflon, or any other semi-flexible sealing means. The extrudate at this point is sufficiently cooled so that the direct contact with the sealing means in no way harms the interior finish of the extrudate. The seal is held in place by an extension 40 of pipe 14. The coolant is thus deflected into annular passageway 52 where the coolant is brought into contact with the interior surface of the extrudate. The size of pipe 34 is chosen such that the annular area is such that the maximum cooling efficiency takes place due to the velocity of coolant. The contact length between the cooling medium and the extrudate is restricted and the travel of the coolant countercurrent to the extrudate is stopped by the flow of the gaseous medium from annular passageway 30' through opening 18, which is located near or in sizing means 41. The abrupt collision of gaseous medium and coolant forces both the coolant and the gas into annular passageway 19, the pressure on the gas entering conduit 17, FIG. 3, is set such that a positive flow of gas is maintained at point 18. The end of pipe 15 is flared outwardly such that the velocity of the gaseous medium in the forward end of passageway 30' is further increased, thereby increasing its momentum and forming a more effective barrier to the entrance of the coolant into passageway 30'. The outward flare of pipe 15 is susbtantially parallel to the taper of sealing means 36, thereby minimizing turbulent effects in this region. The flared end of pipe 15 does not touch the inner surface of extrudate 24.

Thus, a barrier is formed at this end of the intermediate length of tubing by the gaseous medium, that is, without physical contact with the extrudate, which at this point is sufficiently molten so as to be scratched by physical contact with a disk member such as is provided at the other end of the intermediate length.

Referring back to FIG. 3, the O-ring seals or other similar sealing devices at 38 and 39 are such that pipe 14 could be moved further into the mandrel such that the fluid contact area between seal 25 and barrier 18 can thus be increased. Pipe 14 may also be withdrawn such that the fluid contact distance between seal 25 and barrier 18 can be decreased. Thus, the instant invention permits a direct on stream control over the internal cooling of the extrudate. Therefore, the apparatus of the instant invention can be effectively utilized for various extrusion rates while maintaining the optimum internal cooling rate.

Referring again to FIG. 1, the gas in area 30' is under pressure such that a positive flow of said gas is maintained to form an effective barrier to the entrance of the coolant into this passageway However, the extrudate 24 after immediate passage from the annular die opening 11 and before entry into sizing means 41 is still in a semi-fluid state and is incapable of maintaining complete rigidity. Therefore, the pressure equalization chamber 23 is supplied with an opening such that gaseous medium can be introduced into the interior 22 of chamber 23 via conduit 21 to keep the extrudate 24 from expanding unrestrained due to the positive pressure in area 30'. The gaseous medium is exhausted through opening 51.

The fluid employed in the preferred embodiment of the instant invention is water because of its superior heat transfer characteristics, its availability, and its low cost. Wetting agents can be employed to improve the cooling effects, if desired. However, depending upon the temperature and nature of the article being cooled, other fluids, such as glycerol, ethylene glycol, 1,4-dioxane, Freon, etc., may be employed. Liquids which are flammable or hazardous from a health standpoint are operable, but require great care in use and additional means for collecting and recycling the fluids are necesary. One particular advantage of the instant process and equipment is the versatility of the apparatus for controlling the heat transfer parameters. The annular passageway through which the cooling fluid flows may be altered in diameter to permit changing the velocity of the cooling medium and contacting the extrudate so as to obtain optimum cooling. Also, if desired, the contact area may be increased during operation to provide adequate cooling when the extrusion rates are increased.

The gaseous medium employed in the instant invention may be any gas which will not cause corrosion of metals and which has no deleterious effect upon the thermoplastic article being fabricated. Such gases are air, nitrogen, carbon dioxide, and any other of the inert gases or hydrocarbon gases. In the preferred embodiment of this invention, air is used because of its availability and low cost. However, the gaseous medium may be selected for a higher or lower molecular weight depending on the density of the coolant used in order to provide the necessary momentum to form an efficient barrier without resorting to excessive velocities. In addition, the gas can be selected to treat the thermoplastic extrudate to impart additional desired characterisitcs; for example, the gaseous medium may be an oxidizing gas or a mixture of air and an oxidizing gas. If the thermoplastic material selected for extrusion is polyethylene, such an oxidizing treatment would make the surface polar and allow the surface to be coated with additional material to impart impermeability. Gases which are capable of thus treating polyethylene are chlorine, nitric oxide, ozone, oxygen, etc.

Thermoplastic materials contemplated according to the present invention are those synthetic materials which are solid at atmospheric temperatures, and which may be softened under heat and/or pressure to permit casting, extrusion or other processing deformation to produce variously formed shapes as finished products. Suitable thermoplastic materials include polymers of at least one mono-1-olefin having 2 to 8 carbon atoms per molecule, preferably polymers and copolymers of ethylene, propylene and butene. Other typical thermoplastic materials include cellulose polymers such as the acetate, acetate butyrate, etc., ethyl cellulose, methylmethacrylate, polyvinylidene chloride, homopolymers and copolymers of vinyl chloride, vinyl acetate, etc., polystyrene, styrene copolymers, polyacrylonitrile, polyisobutylene, acrylonitrile-butadiene-styrene polymers, polytetrafluoroethylene, polyamide, blends of synthetic and/or natural rubber with PVC and with polystyrene, blends of polyisobutylene with styrene or polyvinyl alcohol. Polypropylene tubing when quenched with water in the above manner exhibits surprisingly improved transparency and uniformity of gloss in a finished product formed by cutting parisons from said tubing, reheating said parisons to a temperature of 1 to 50° F. below the crystalline melting point of said polypropylene, and biaxially orienting said parisons to form blow molded bottles, and the like.

EXAMPLE

Propylene homopolymer having a density of 0.905 (ASTM D 1505–63–T), a melt flow of 3.5 (ASTM D 1238–62T, Condition L) and a crystalline melting point of about 340° F. was extruded into tubing having an internal diameter of 0.8 inch and a wall thickness of 0.15 inch using an internal water cooling apparatus such as that shown in the drawings. The cooling water temperature was about 65° F. The fluid used for the gaseous barrier was air. The resulting cooled tubing was cut into 5-inch lengths and reheated to 320–338° F. These thus conditioned parisons were then stretched and blown to give biaxially oriented blow molded hollow bottles. Identical bottles were made from identical polymer in an identical manner except that no internal cooling was used (the outer surface was cooled in both cases). A visual examination revealed the bottles made in accordance with the instant invention had surprisingly improved clarity and gloss compared with bottles made from the tubing which had not been internally cooled.

Various modifications and alterations of this invention will become apparent to those skilled in the art from the foregoing description, accompanying drawings, and appended claims without departing from the scope and spirit of this invention, and it should be understood that this invention is not to be limited unduly to that set forth herein for illustrative purposes.

I claim:

1. Apparatus for contacting an intermediate length of the interior of a tubular article with a first fluid which comprises in combination:
    (a) means for conveying separately a first and a second fluid internally through said article in the same direction of flow emanating from the same end of said article,
    (b) means for releasing said second fluid from said conveying means in contact with the internal surface of said article at a first end of said intermediate length,
    (c) means for releasing said first fluid from said conveying means at a second end of said intermediate length axially disposed downstream from said first end of said intermediate length,
    (d) means for reversing the direction of flow of said first fluid and bringing said first fluid into contact with said intermediate length whereby said first fluid contacts the interior of said intermediate length flowing from said second to said first end, and
    (e) means for withdrawing said first and second fluid from contact with said intermediate length at the meeting point of said first and second fluids.

2. Apparatus for contacting an intermediate length of the interior of a tubular article with a first fluid which comprises in combination:
    (a) a first conduit disposed within said tubular article having a first extremity at a first end of said intermediate length and forming a first annular passageway between said first conduit and the interior of said tubular article communicating between the interior of said tubular article in said intermediate length at said first extremity and a source of a second fluid,
    (b) plugging means within said tubular article axially spaced from said first extremity of said first conduit at a second end of said intermediate length for substantially preventing the passage of fluid,
    (c) a second conduit disposed within said first conduit forming a second annular passageway between said first and second conduits communicating between the interior of said tubular article in said intermediate length at said first extremity and an exit means, and
    (d) said second conduit extending axially beyond said first extremity of said first conduit and communicating between the interior of said tubular article within said intermediate length and a source of a first fluid.

3. Apparatus for contacting an intermediate length of the interior of tubular thermoplastic extrudate with a first fluid comprising in combination:
    (a) means to extrude molten thermoplastic through an annular outlet of a die,
    (b) tubular shaping means to receive the resulting extrudate axially disposed downstream of said die,
    (c) a chamber surrounding and enclosing said extrudate between said outlet of said die and said shaping means, and said chamber having a fluid inlet and a fluid outlet,
    (d) a die mandrel positioned in said die,
    (e) a first conduit coaxially disposed within said die mandrel and extending therefrom coaxially disposed in said extrudate beyond said shaping means,
    (f) said first conduit having a first extremity at a first end of said intermediate length and forming a first annular passageway between said first conduit, and the interior of said tubmular extrudate downstream of said die outlet and the interior of said die mandrel upstream of said die outlet, said first annular passageway communicating between the interior of said tubular extrudate in said intermediate length at said first end and a source of a second fluid,
    (g) plugging means with said tubular extrudate axially disposed downstream from said first extremity of said first conduit at a second end of said intermediate length for substantially preventing the passage of the fluid,
    (h) a second conduit disposed within said first conduit forming a second annular passageway between said first and second conduits communicating between the interior of said tubular extrudate in said intermediate length at said first end and an exit means,
    (i) said second conduit extending axially beyond said first extremity of said first conduit,
    (j) a third conduit coaxially disposed within said tubular extrudate within said intermediate length and coaxially disposed outside said second conduit,
    (k) said third conduit having a first end, closest to said first end of said intermediate length, closed and having a second end closest to said plug means in open communication between said interior of said tubular extrudate in said intermediate length and a third annular passage way defined by said third and second conduits, and
    (l) the interior of said second conduit being in open communication with said third annular passageway and a source of a first fluid.

4. Apparatus according to claim 3 wherein said first extremity of said first conduit is flared outwardly whereby the annular area of said first annular passageway is substantially reduced and said first end of said third conduit is tapered inwardly whereby said outward flare and said inward taper are substantilly parallel whereby turbulent mixing of said first and second fluids is minimized.

5. A method for internal liquid cooling of a continuously extruded hollow tube comprising: providing a physical barrier at a first point within said hollow tube; directing an annular stream of gaseous fluid at a second point within said hollow tube along an inner surface of said hollow tube in a direction toward said first point to provide a gaseous fluid barrier, said second point being spaced upstream relative to the extrusion, from said first point so as to define an intermediate length of said hollow tubing; contacting said inner surface of said hollow tubing with a cooling liquid in the area of said first point; causing said cooling liqud to flow from said first point to said second point; and withdrawing said cooling liquid and gaseous fluid from the interior of said hollow tubing.

References Cited

UNITED STATES PATENTS

| 2,708,772 | 5/1955 | Moncrieff. |
| 3,296,661 | 1/1967 | Moustier. |
| 3,427,638 | 2/1969 | Vukovich. |

FOREIGN PATENTS

| 396,401 | 1/1966 | Switzerland. |

WILLIAM J. STEPHENSON, Primary Examiner

U.S. Cl. X.R.

18—14, 19